(No Model.)

G. S. BRIGGS.
PLOWSHARE.

No. 421,661. Patented Feb. 18, 1890.

Witnesses:
E. F. Dowling.
Edw. J. Hollister.

Inventor:
George S. Briggs,
per L. L. Morrison,
Attorney.

UNITED STATES PATENT OFFICE.

GEORGE S. BRIGGS, OF ROCKFORD, ILLINOIS, ASSIGNOR TO THE L. A. WEYBURN COMPANY, OF SAME PLACE.

PLOWSHARE.

SPECIFICATION forming part of Letters Patent No. 421,661, dated February 18, 1890.

Application filed September 10, 1889. Serial No. 323,569. (No model.)

*To all whom it may concern:*

Be it known that I, GEORGE S. BRIGGS, a citizen of the United States, residing at Rockford, in the county of Winnebago and State of Illinois, have invented certain new and useful Improvements in Plowshares, of which the following is a specification.

This invention relates to the production of an improved plowshare; and it consists in increasing the thickness of the welding edge thereof by upsetting the same, or by welding a strip or patch thereupon; and it further consists in providing said upset or thickened portion of the share with a rib to serve as a guide in welding the landside thereto.

Figure 1:
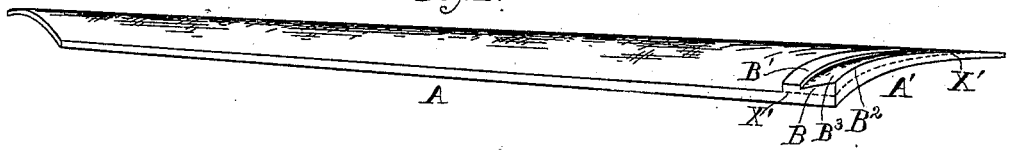
Figure 2:
Figure 3:
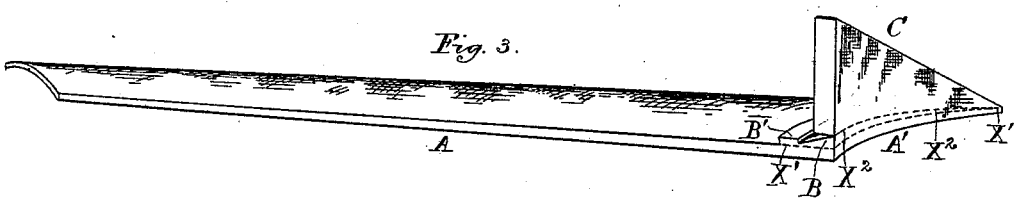
Figure 4:
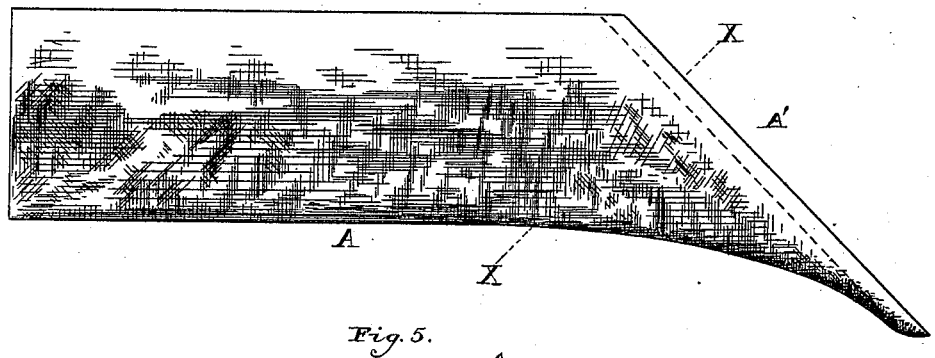
Figure 5:
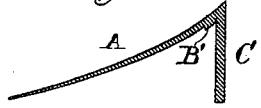

Referring to the accompanying drawings, which form a part of this specification, Figure 1 is an isometric view of a plowshare provided with my improvement by welding the same thereupon. Fig. 2 is a like view of the same, the improvement being integral with the share and produced by upsetting and stamping the edge portion thereof, as shown. Fig. 3 is also a like view of a share having a landside welded thereto. Fig. 4 is a plan view of the share and landside shown in Fig. 3. Fig. 5 is a vertical section at the line X X in Fig. 4 of the share and landside.

Like letters of reference indicate corresponding parts throughout the several views.

A is a plowshare of the ordinary form. A' is the welding edge thereof.

B is a patch welded onto the back of the share A, the line of weld being indicated by the dotted line X' X', having a rib or shoulder B' extending along the same, substantially parallel to the welding edge A' thereof, to serve as a guide in welding a landside to said share, the outer edge $B^2$ of said patch being thicker than its central portion $B^3$, which is beveled from said outer edge $B^2$ to the rib B' sufficiently to produce the proper angle between the share and landside, when welded together, without beveling the upper or welding edge of the landside.

C is a landside welded to one of the plowshares A, the line of weld being indicated by the dotted line $X^2 X^2$.

Three important advantages are subserved by applying my improvement to plowshares. The welding edge of the share can be heated several times, as is often necessary in small forges, in the process of welding a landside thereto without burning and thereby injuring the welding edge of the share. The share being re-enforced at its junction with the landside is rendered much more durable. The rib or shoulder insures welding the share and landside together in exactly the right relative positions.

I claim—

1. A plowshare having its welding edge thicker than the rest thereof, being beveled from its outer edge $B^2$ to a rib or shoulder B' extending along the back of the share, substantially as described.

2. The combination of a plowshare with a patch welded on the back thereof, the latter having a rib or shoulder formed on its outer face substantially parallel to the welding edge of the share, the surface of the patch between the rib and welding edge being beveled sufficiently to produce the proper angle between the landside and share, when welded together, without beveling the upper or welding edge of the landside, substantially as described.

GEORGE S. BRIGGS.

Witnesses:
LEWIS A. WEYBURN,
L. L. MORRISON.